United States Patent
Allen

(10) Patent No.: US 8,757,892 B1
(45) Date of Patent: Jun. 24, 2014

(54) CONNECTOR

(71) Applicant: Brantner & Associates, Inc., El Cajon, CA (US)

(72) Inventor: Mark David Allen, San Diego, CA (US)

(73) Assignee: Brantner & Associates, Inc., El Cajon, CA (US)

( * ) Notice: Subject to any disclaimer, the term of this patent is extended or adjusted under 35 U.S.C. 154(b) by 0 days.

(21) Appl. No.: 13/949,075

(22) Filed: Jul. 23, 2013

(51) Int. Cl.
*G02B 6/38* (2006.01)

(52) U.S. Cl.
CPC ............ *G02B 6/3885* (2013.01); *G02B 6/3825* (2013.01); *G02B 6/3839* (2013.01); *G02B 6/3869* (2013.01); *G02B 6/3878* (2013.01)
USPC .......................................................... 385/59

(58) Field of Classification Search
CPC .. G02B 6/3885; G02B 6/3878; G02B 6/3869; G02B 6/3825; G02B 6/3839
USPC .......................................................... 385/59
See application file for complete search history.

(56) References Cited

U.S. PATENT DOCUMENTS

| | | | |
|---|---|---|---|
| 4,696,540 A | 9/1987 | Adams et al. | |
| 4,756,595 A * | 7/1988 | Braun et al. | 385/75 |
| 4,801,277 A | 1/1989 | Seilhan | |
| 5,838,857 A * | 11/1998 | Niekrasz | 385/56 |
| 5,873,750 A | 2/1999 | Cairns et al. | |
| 2003/0016916 A1 | 1/2003 | Allen et al. | |

FOREIGN PATENT DOCUMENTS

WO    WO 2005/081028    9/2005

OTHER PUBLICATIONS

Jenkins, David, "Utilizing Pressure Balanced Oil Filled (PBOF) Hose Cable Assemblies with Electric and Fiber Optic Connectors" *IEEE* (2008): 1-3.

* cited by examiner

*Primary Examiner* — Jerry Blevins
(74) *Attorney, Agent, or Firm* — Knobbe, Martens, Olson & Bear LLP

(57) ABSTRACT

This disclosure provides systems, methods, and devices for connecting optical fibers. In one aspect, a connector includes a transfer tube for equalizing the pressure between two chambers within the two connectors when the connectors are mated. The chambers may house biasing elements coupled to optical fiber holders to provide a pressure independent force against optical fiber terminals. The optical fiber holders may include side openings for receiving optical fibers.

19 Claims, 12 Drawing Sheets

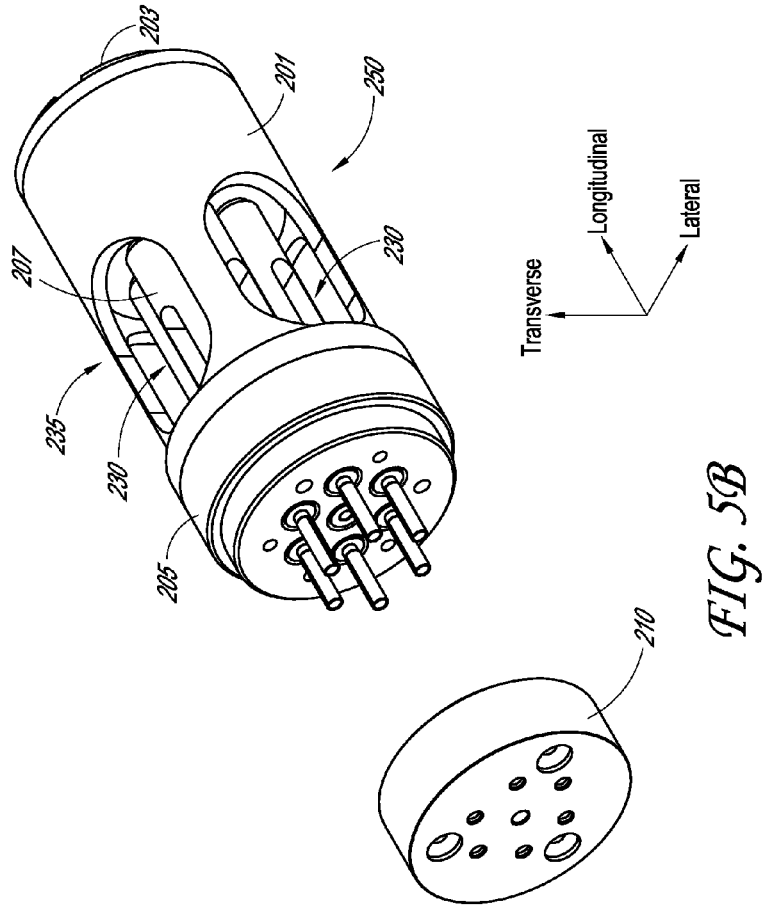
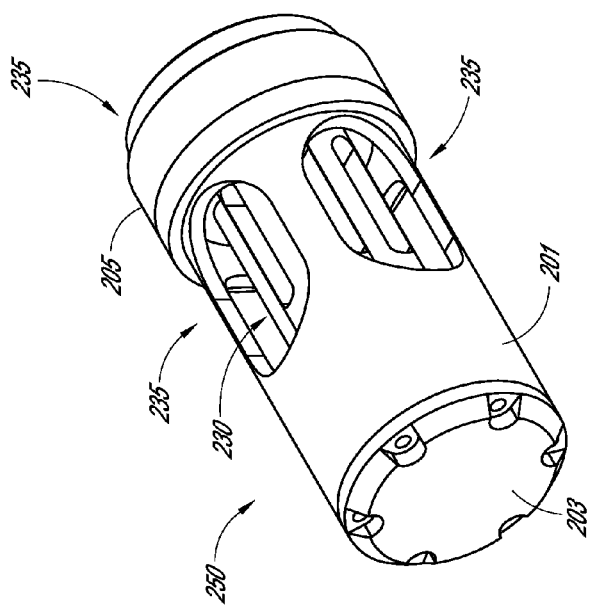
FIG. 5B

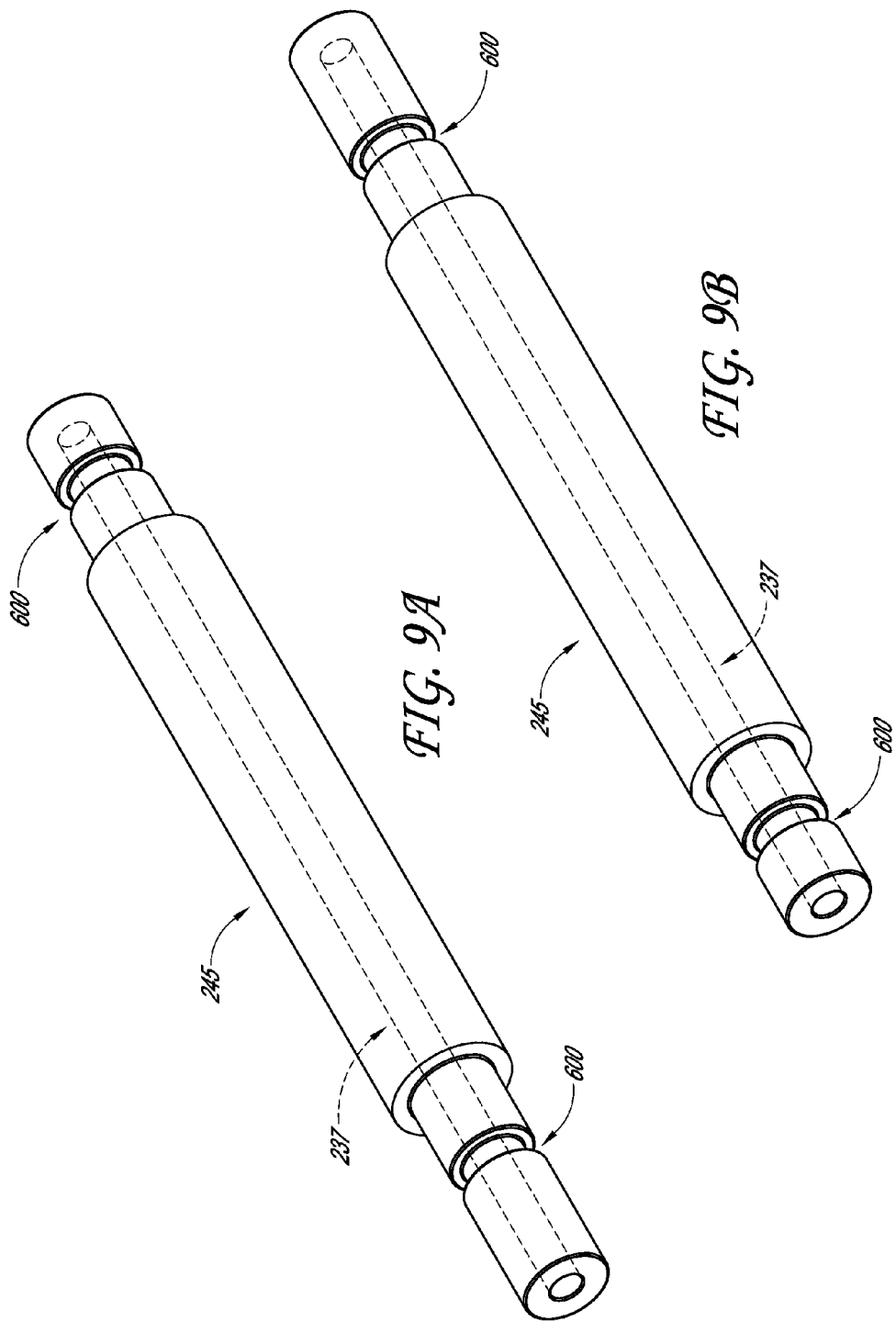

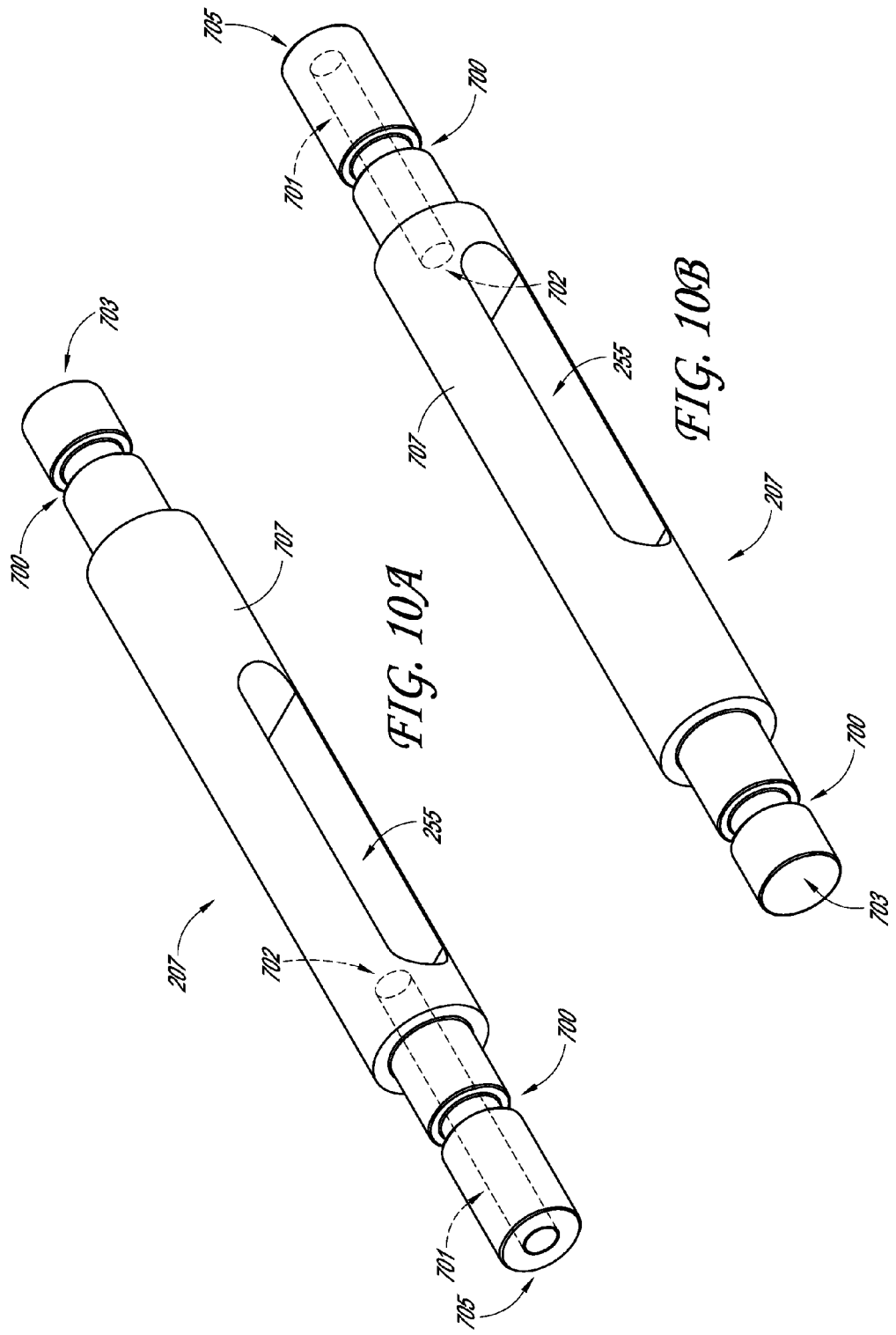

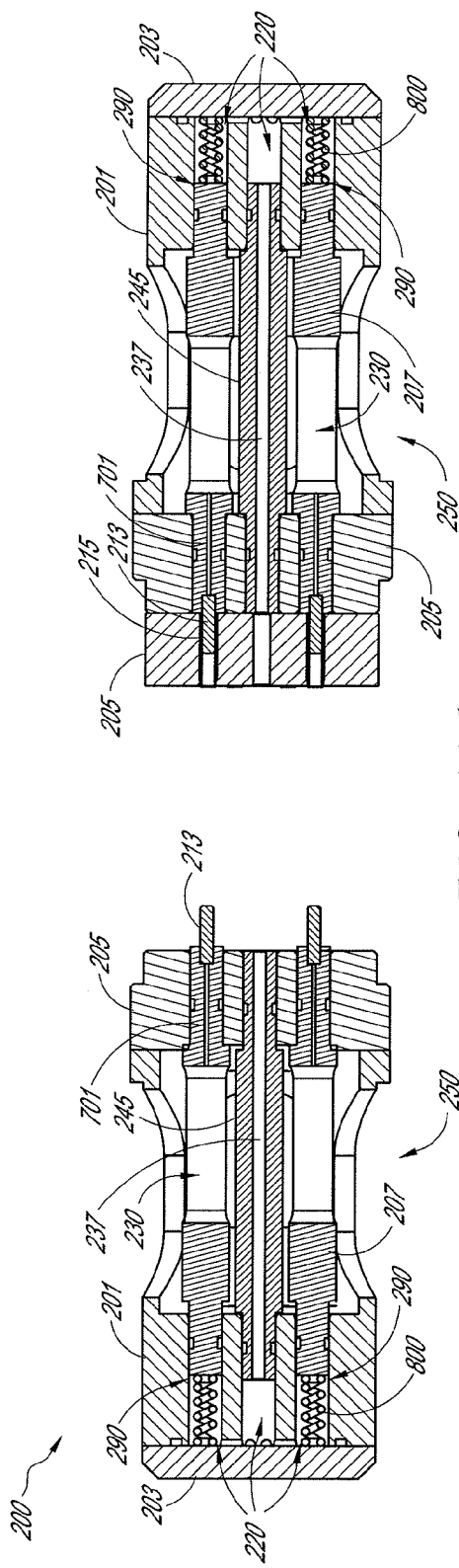
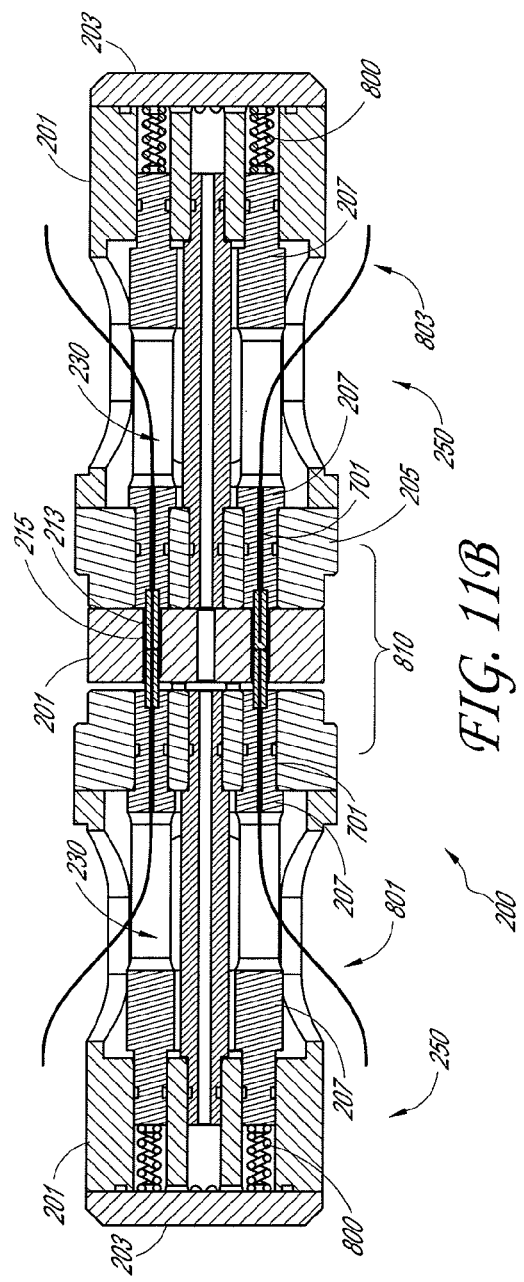
FIG. 11A
FIG. 11B

CONNECTOR

BACKGROUND

1. Field

The inventions disclosed herein relate generally to the field of connectors and more specifically to fiber-optic and/or electrical connectors for use in deep sea applications.

2. Description of the Related Art

Underwater connectors are used extensively in ocean related applications including, for example, military submarines, research submarines, ocean science observatories, towed arrays, drilling systems, production control systems, remotely operated vehicles ("ROVS"), other mobile vehicle applications, underwater research and exploration activities, ocean mining, and offshore oil production.

In the design of underwater deep-sea connectors, several environmental parameters must be considered. A serious consideration is the exposure to extremely high water pressure at great ocean operating depths. These pressures can crush or otherwise deform connectors that are not properly designed to withstand such pressure. High pressure and water tight seals may also be provided to prevent water ingress that may lead to short circuiting of electrical contacts and otherwise foul the connector components. Connector materials in contact with salt water experience corrosion processes as well. At very great depths below the surface of the sea, the temperature of the seawater may approach freezing temperatures. Thus, connectors used in such environments will experience extreme external temperatures and pressures as well as hostile corrosive effects.

Many subsea electrical and optical cable and connection systems now utilize Pressure Balanced Oil Filled ("PBOF") cabling solutions. These cables utilize an elastomeric tube as a conduit for electric wires, copper conductors, and/or fiber optic lines. The elastomeric conduit is filled with a compensating fluid, allowing the sea pressure to freely communicate with the interior oil volume, equalizing the pressure in the assembly. This equalized differential pressure eliminates any motive force for seawater introduction resulting in sustained performance and operating lifetimes. Thus, PBOF cabling provides for a reliable and configurable cable system suitable for many subsea applications.

SUMMARY

The devices, systems, and methods disclosed herein have several features, no single one of which is solely responsible for its desirable attributes. Without limiting the scope as expressed by the claims that follow, its more prominent features will now be discussed briefly. After considering this discussion, and particularly after reading the section entitled "Detailed Description" one will understand how the features of the system and methods provide several advantages over traditional systems and methods.

The subject matter disclosed herein relates to an underwater fiber optic connector. The connector includes a transfer tube for equalizing the pressure between two connectors when the two connectors are coupled together. In addition, the connector may include spring loaded optical fiber holders within the connector having side openings therein for the passage of optical fibers. The configurations disclosed below allow for a connection that is less susceptible to failure from pressure differences that cause forces to act on the fiber optic contacts.

One innovative aspect of the subject matter described in this disclosure is a connector that may comprise a connection face, a chamber, and at least one optical fiber holder, having a first end positioned within at least a portion of an opening in the connection face and a second end positioned within at least a portion of the chamber, the at least one optical fiber holder having an opening in a side surface for receiving an optical fiber. At least one biasing element may be positioned within the chamber and the biasing element may be configured to bias the optical fiber holder toward the connection face. At least one passageway may lead from the chamber to the connection face and the passageway may provide a pressure communication link between the connection face and the chamber. In some aspects, the pressure communication link comprises a conduit connecting the connection face and the chamber. In some aspects, the pressure communication link comprises an ambient airway passage. As used herein, the term fluid includes both liquids and gasses. The optical fiber holder may be longitudinally movable between a first position when the connector is not connected with another connector and a second position when the connector is connected with another connector. The passageway may comprise a lumen extending through a tube having a first end positioned within at least a portion of an opening in the connection face and a second end positioned within at least a portion of the chamber.

Another innovative aspect of the subject matter described in this disclosure is a connection system that may comprise a first connector insert having a connection face and chamber in pressure communication with the connection face, a second connector insert having a connection face and chamber in pressure communication with the connection face, at least one optical fiber holder having a first end at least partially positioned within an opening in the connection face of the first connector insert and a second end coupled to a biasing element positioned within the chamber of the first connector insert; and an outer shell configured to enclose the connection face of the first connector and the connection face of the second connector to form a pressure tight enclosure with the chambers in pressure communication through the connection faces. The optical fiber holder may include an opening in a lateral or transverse surface of the optical fiber holder for insertion of an optical fiber.

Another innovative aspect of the subject matter described in this disclosure is a connector that may comprise a connection face, a chamber, and at least one optical fiber holder having a first end positioned within at least a portion of an opening in the connection face and a second end at positioned within at least a portion of the chamber, at least one biasing element configured to bias the optical fiber holder toward the connection face, and a means for preventing a pressure dependent force from acting on the second end of the at least one optical fiber holder. The means for preventing a pressure dependent force may comprise a pressure communication link between the chamber and the connection face and an opening in a lateral or transverse surface of the optical fiber holder for insertion of an optical fiber.

Another innovative aspect of the subject matter described in this disclosure is a deep sea underwater connector for connecting angled fiber optic terminals that may comprise a connector shell, an insert disposed within the connector shell having an end cap coupled to one end and a connection cap coupled to the opposite end, the connection cap having a rear face at a first pressure and a connection face at a second pressure, a sealed chamber disposed within the insert chamber, the sealed chamber configured to be at substantially the second pressure, a biasing element disposed within the rear chamber, at least one fiber optic holder having a rear end at least partially disposed in the rear chamber and coupled to the biasing element, and a connection end at least partially disposed within the connection cap, and a passageway for a fiber optic line disposed within the fiber optic holder extending from a first opening in the connection end to a second opening positioned between the connection end and the rear chamber.

These and other features, aspects, and advantages of the invention disclosed herein are described below with reference to the drawings of certain embodiments of the present invention.

BRIEF DESCRIPTION OF THE DRAWINGS

The illustrated embodiments of the connection system and components are intended to illustrate but not to limit the invention. Additionally, from figure to figure, the same reference numerals have been used to designate the same components of an illustrated embodiment. The following is a brief description of each of the drawings.

FIG. 5B is a partial exploded perspective view of the connector system of FIG. 5A.

FIGS. 9A-9B are perspective views of an equalizer body of the of the connector system of FIGS. 5A-5B.

FIGS. 10A-10B are perspective views of an optical contact body of the of the connector system of FIGS. 5A-5B.

FIG. 11A is a cross-sectional view of the connector system of FIGS. 5A-5B.

FIG. 11B is a cross-sectional view of the connector system of FIGS. 5A-5B when coupled together and including a fiber optic connection.

DETAILED DESCRIPTION

Figure 1:
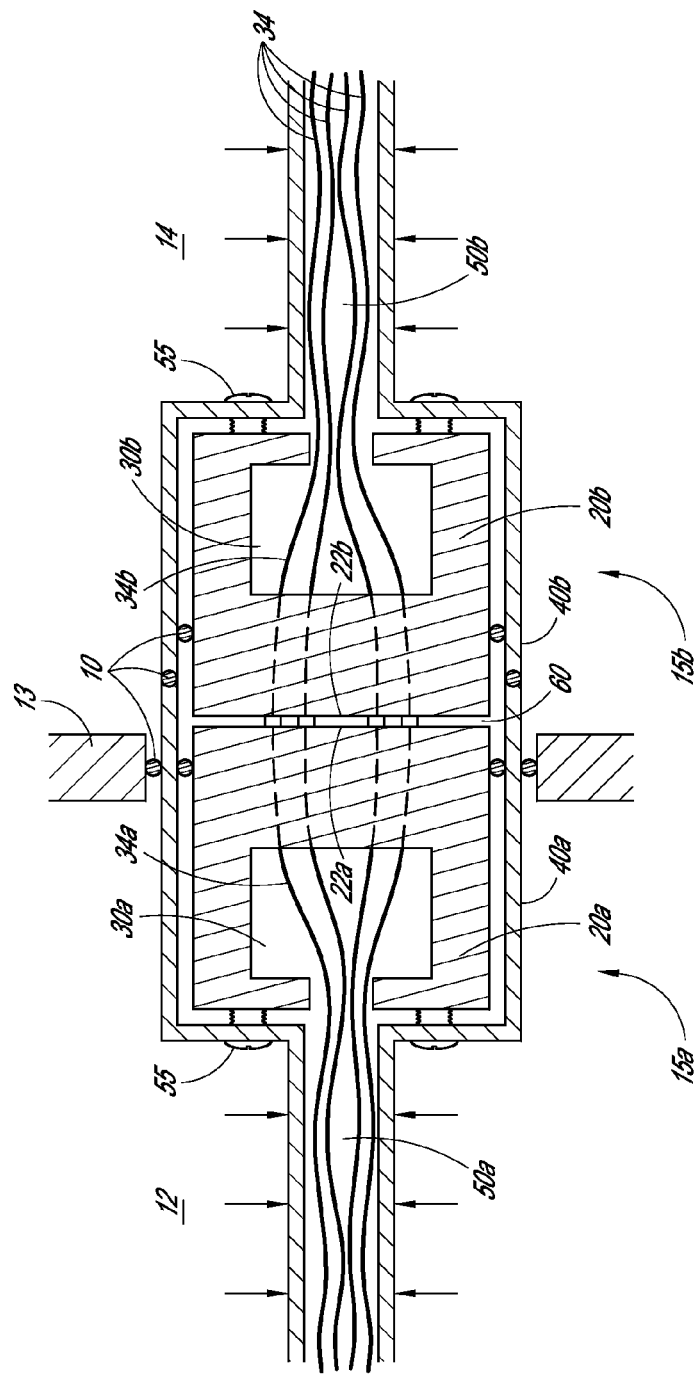
FIG. 1 is a schematic cross-sectional view of a conventional connection system.

The following description and the accompanying figures describe and show various embodiments and are made to demonstrate several possible configurations that a connection can take to include various disclosed aspects and features. The illustration of the connector systems and components in this context is not intended to limit the disclosed aspects and features to the specified embodiment or to any particular usage. Those of skill in the art will recognize that the disclosed aspects and features are not limited to any particular embodiment of a connector, which include one or more of the inventive aspects and features herein described, and can be designed for use in a variety of applications. It is noted that the figures provided herein may not be drawn to any particular proportion or scale, and that many variations can be made to the illustrated embodiments.

As used herein, the singular forms "a," "an," and "the" include both singular and plural referents unless the context clearly dictates otherwise. The terms "comprising," "comprises" and "comprised of" as used herein are synonymous with "including," "includes" or "containing," "contains," and are inclusive of open-ended and do not exclude additional, non-recited members, elements or method steps. The terms "comprising," "comprises," and "comprised of" when referring to recite components, elements or method steps also include embodiments which "consist of" said recited components, elements or method steps. Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the invention described herein are capable of operation in other sequences than described or illustrated herein.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures, or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the appended claims, any of the features of the claimed embodiments can be used in any combination.

Optical fibers are frequently used for communicating with deep underwater submersibles. For example, it is often necessary to connect a fiber optic cable to a submersible in a dry environment using a fiber optic connector and then to submerge the submersible to great ocean depths. Thus, the fiber optic connector must be able to withstand high pressures (for example, a pressure greater than 4,000 psi). The fiber optic connector must also precisely align and press together multiple fiber optic contacts such that light may be transmitted efficiently therethrough. In addition, many deep underwater submersibles include external fiber optic lines connecting various components of the submersible. Such external fiber optic lines may comprise PBOF cables.

The connection devices described herein are especially adapted to join two PBOF cables containing one or more electrical and/or fiber optic lines together. The connection devices described herein are also adapted to join a PBOF cables containing one or more electrical and/or fiber optic lines to a submersible. The connectors are configured such that there is an approximately constant contact force between two fiber optic lines with their faces mated together and/or configured such that there is an approximately constant contact force between a connection at end of a fiber optic line and a bulkhead connection. This is advantageous because pressure imbalances can cause one optical fiber to be forced against another optical fiber at the junction between the two lines which can damage the optical line and/or optical connection. The connectors are also configured to have a long operating life in seawater and configured to withstand large pressures. Another advantage of some embodiments of the current disclosure is that two halves of a connector may be substantially the same, eliminating the need for a specialized male-female system.

In some applications, when a PBOF cable is coupled to a submersible, a pressure imbalance between the cable side of a connection and submersible side of the connection is created because a portion of the PBOF cable outside of the submersible may be at a first pressure that is substantially the same as the pressure outside of the submersible while a portion of the cable inside the submersible may be at a second pressure substantially the same as the pressure inside the submersible. Often the pressure outside of the submersible is much greater than the pressure inside of the submersible. This pressure imbalance between two portions of one or more PBOF cables coupled together may impart forces on the optical fibers within the cables. A pressure imbalance may also be present when a PBOF cable is connected to a bulkhead of an underwater submersible. Such pressure imbalances may push the end face of one optical fiber against the end face another optical fiber at the interface between two optical fibers causing the optical fibers to fracture and/or become misaligned.

In some embodiments, the optical fibers include an angled polished contact ("APC") termination, or similar commonly known termination scheme. An APC termination typically utilizes a complimentary eight degree angled cut on the end of each of the fiber optic leads. It is desirable to ensure the two leads are correctly aligned, axially and angularly, such that of the angled ends of the leads are in complimentary contact with each other. Pressure imbalances can lead to forces at the interface of two complimentary APC ends that are mated in contact with one another. Such forces can cause the APC ends to move, leading to misalignment of the APC interface. Thus, the connection system disclosed herein advantageously reduces misalignment of APC ends by maintaining an approximately constant contact force at the interface between the two ends.

Figure 5A:
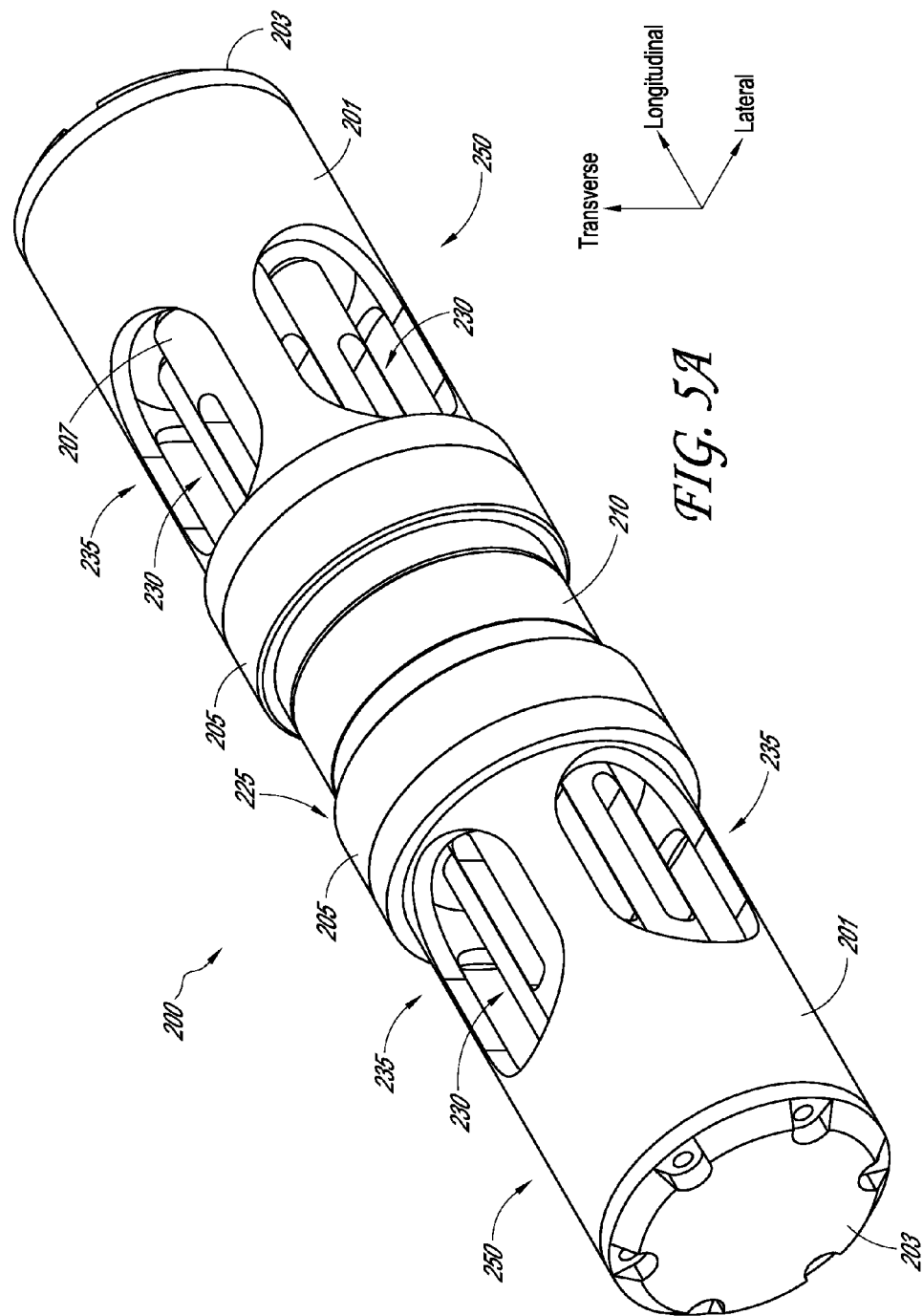
FIG. 5A is a perspective view of a connector system according to another embodiment.

To assist in the description of the components of embodiments of the connection system, the following coordinate terms are used, consistent with the coordinate axes illustrated, for example, in FIG. 5A. A "longitudinal axis" extends generally lengthwise through the connectors 205 and is generally parallel to the generally cylindrical passageways running through the connectors 205. A "lateral axis" is normal to the longitudinal axis and is generally parallel to the plane of the front face of the connectors 205. A "transverse axis" extends normal to both the longitudinal and lateral axes. In addition, as used herein, the "longitudinal direction" refers to a direction substantially parallel to the longitudinal axis; the "lateral direction" refers to a direction substantially parallel to the lateral axis; and "the transverse direction" refers to a direction substantially parallel to the transverse axis.

FIG. 1 is a schematic cross-sectional view of a conventional connection system. The conventional connection system illustrates the interior of a submersible 12 and an exterior of a submersible 14 separated by a pressure sealed (with seals 10 in FIG. 1) partition 13. The interior of the submersible 12 may be at a first pressure and the exterior of the submersible 14 may be at a second pressure. When the submersible is deployed to great ocean depths, the pressure difference between the interior of the submersible 12 and the exterior of the submersible 14 may be large. An exterior portion of a PBOF cable 50b is coupled to an exterior connector 15b while an interior portion of a PBOF cable 50a is coupled to an interior connector 15a and/or bulkhead. The PBOF cables include a plurality of optical fibers 34. As discussed above, the pressure difference between the exterior portion of the PBOF cable 50b and the interior portion of the PBOF cable 50a may also be large.

The connectors 15a and 15b include two connector inserts 20a and 20b substantially surrounded by two connector shells 40a and 40b. One or more fasteners 55 may secure the connector insert 20a and 20b to the connector shell 40a and 40b. Thus, the connector insert 20a and 20b may be prevented from moving relative to the connector shell 40a and 40b. The connector inserts 20a and 20b include connection faces 22a and 22b. When the two connector shells 40a and 40b are coupled together in a pressure sealed manner, a central chamber 60 is formed. Seals 10 are configured to prevent liquid and/or gas from entering or exiting the central chamber 60. Chambers 30a and 30b positioned behind the connection faces 22a and 22b are in pressure communication with the PBOF cables 50a and 50b. The optical fibers 34 may pass through the connection faces 22a and 22b and various techniques can be used to ensure that fluid and/or gas does not pass through the connection face and into or out of the central chamber 60. Furthermore, various biasing mechanisms may be employed to provide a biasing force against an optical fiber that exits the connection face. For instance, a spring may be disposed in the chamber 30 that abuts a rear surface of an optical contact tube.

Continuing with FIG. 1, a first optical fiber 34a passes through the interior PBOF cable 50a and into the chamber 30a of connector 15a. The first optical fiber 34a then passes though the connection face 22a and at least the terminal end of the first optical fiber 34a extends into the central chamber 60. A second optical fiber 34b passes through the exterior PBOF cable 50b and into the chamber 30b of connector 15b. The second optical fiber 34b then passes though the connection face 22b and at least the terminal end of the first optical fiber 34b extends into the central chamber 60 and is mated with the terminal end of the first optical fiber 34a. As discussed above, in the connection system shown in FIG. 1, a pressure imbalance between, for example, chamber 30a and central chamber 60 may cause a force against the optical fibers that pass through the connector insert 30a.

Figure 2:
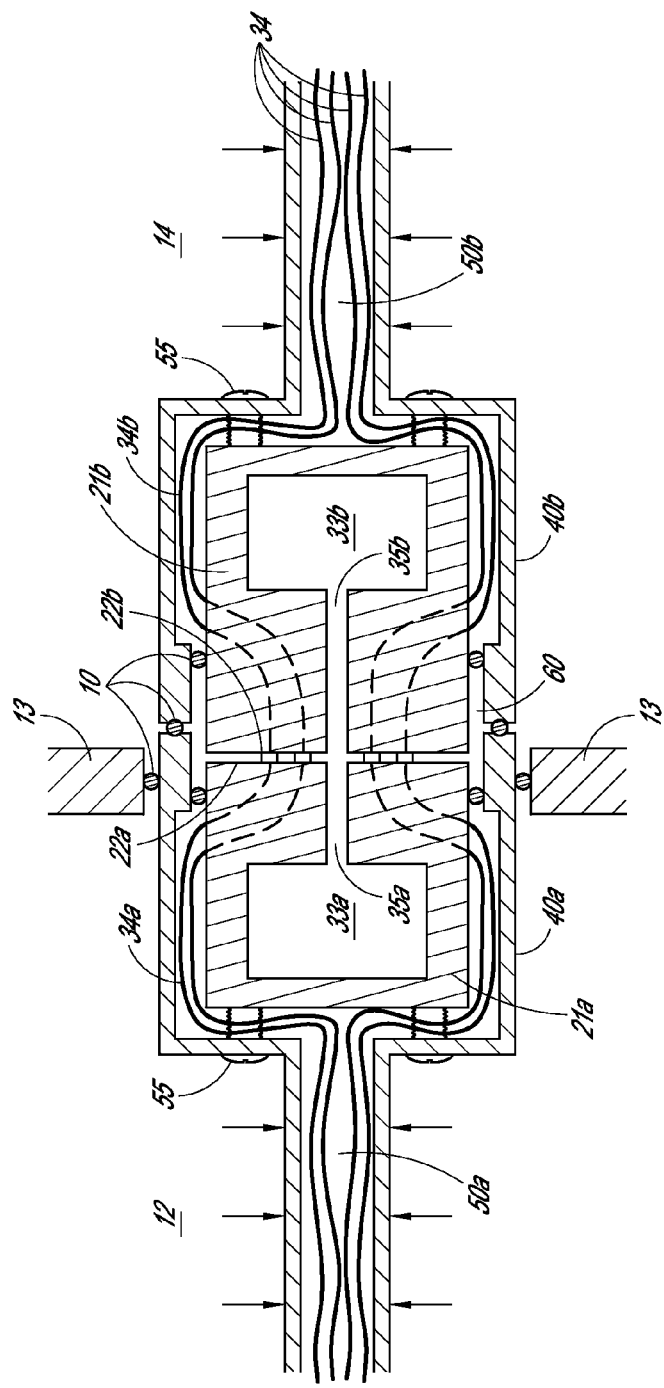
FIG. 2 is a schematic cross-sectional view of a connection system according to one embodiment.

Turning to FIG. 2, a schematic cross-sectional view of a connection system according to one embodiment is illustrated. FIG. 2 is similar to FIG. 1. However, in the embodiment shown in FIG. 2, the optical fibers enter through the sides of the connector inserts 21a and 21b. Thus, the impact of pressure dependent forces acting against the portion of the optical fibers passing though the connector insert is reduced. In addition, the connector inserts 21a and 21b include chambers 33a and 33b that are in pressure communication with each other and the central chamber 60 via passageways 35a and 35b. The chambers 33a and 33b may house biasing members that can provide an approximately constant force against the optical fibers that is independent of any pressure differences in the respective PBOF cables 50a and 50b as will be further explained below.

Figure 3:
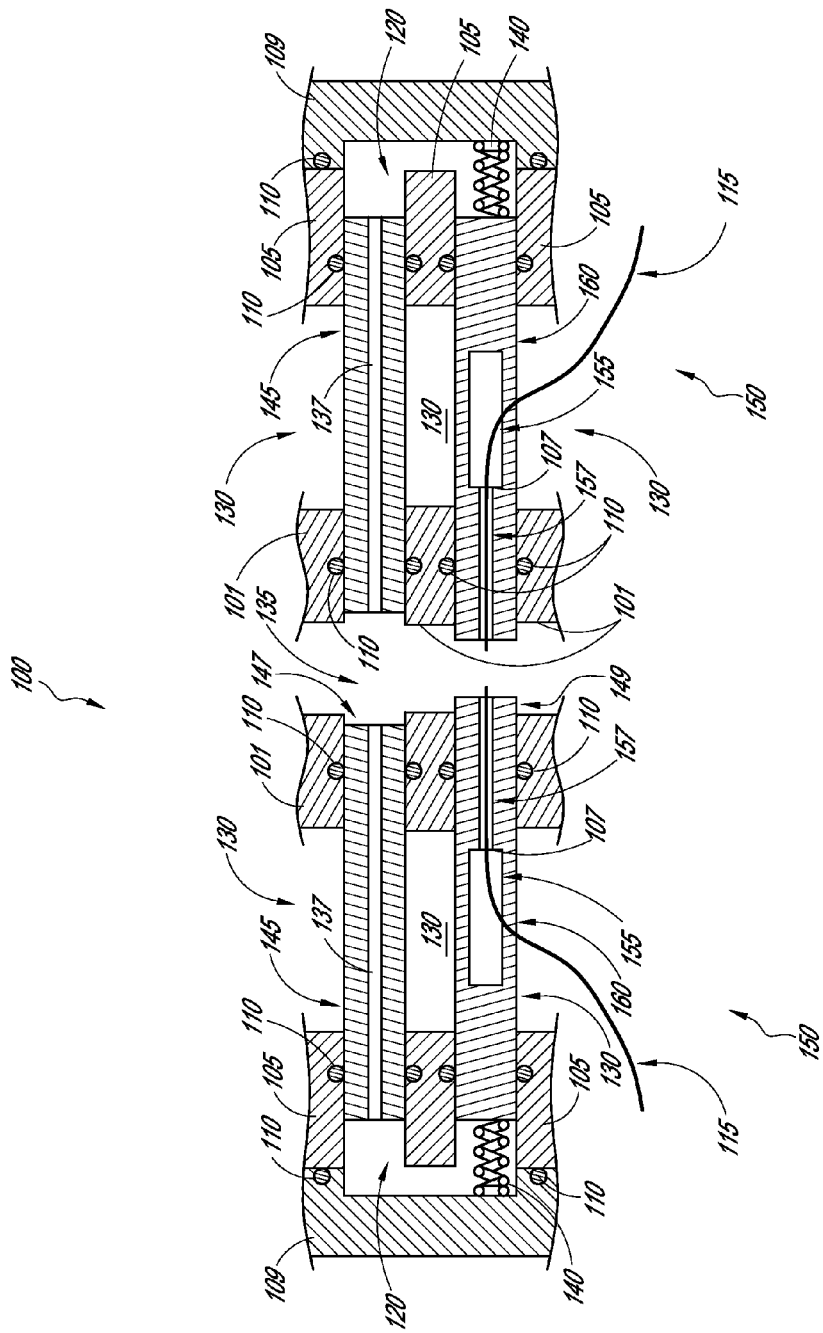
FIG. 3 is a schematic cross-sectional view of a connector system according to another embodiment.

With reference now to FIG. 3, a connection system 100 according to one embodiment is illustrated. The connection system 100 includes two connectors 150. The connectors 150 are configured to be coupled and secured together such that the interface area 135 between the two connectors 150 is pressure sealed. The connectors 150 can be secured together such that liquid and/or gas may not enter or exit the interface area 135 between the connection faces of two connectors 150. The connectors 150 can be coupled together by any technique known in the art. For example, the connectors 150 may be surrounded by an outer shell that has a snap together or screw together connection. One or more seals may be included between such an outer shell and the connectors 150 to ensure a pressure tight connection.

Continuing with FIG. 3, each connector 150 may include a front cap 101 and a rear cap 109 sealingly secured to an insert 105. The rear cap 109 and insert 105 can form a chamber 120. In order to sealingly secure the rear cap 109 to the insert 105, a seal 110 may be included between the cap 109 and the insert 105. The interior 130 of the insert 150 behind the front cap 101 and in front of the chamber 120 may be in pressure communication with a PBOF cable. The front cap 101 is further configured such that liquid or gas from the interior of the connector 130 cannot enter the interface 135 between the connection sides of two connectors 150.

The chamber 120 is in pressure communication with the interface area 135 between the two connectors 150. In this way, the chamber 120 will have the same internal pressure as the pressure at the interface 135 between the two connectors 150. In addition, when two connectors 150 are coupled together, the pressure in both chambers 120 of both connectors 150 will be at the same pressure because the two chambers 120 are both in pressure communication with the interface area 135. In general, pressure communication may be established by providing a passageway in fluid and/or gaseous communication between the connection face and the chamber. The pressure communication link may comprise an ambient airway passage. Thus, when a connector disclosed herein is coupled to another connector or similarly constructed bulkhead above water, the connection face and rear chamber are both at ambient pressure. In other embodiments, the rear chamber comprises a sealed chamber that has an ambient internal pressure. Thus, a fluid and/or gaseous communication between the connection face and the chamber may not be required.

In the illustrated embodiment of FIG. 3, an equalizer tube 145 is used to provide such a pressure communication with the interface area 135 between the connectors 150 and the chambers 120. As shown, one end of the equalizer tube 145 is disposed at least partially within the chamber 120 and the other end of the equalizer tube 145 is disposed at least partially within an opening 147 in the front cap 101. The equalizer tube 145 may include at least one lumen 137 extending therethrough such that air or gas may pass to and from the chamber 120, through the lumen 137, and into and out of the interface 135 between the two connectors 150. A seal 110 may be positioned between the equalizer tube 145 and the opening in the chamber 120 that the equalizer tube 145 passes through. Another seal 110 may be positioned between the equalizer tube 145 and the opening in the front cap 101 that the equalizer tube 145 passes through. In this way, liquid and/or gas may not pass from the interior region 130 of the connector into the chamber 120 or into the interface 135 between two connectors.

With continued reference to FIG. 3, each connector 150 includes an optical fiber holder 160. As shown, one end of the optical fiber holder 160 is disposed at least partially within the chamber 120 and the other end of the optical fiber holder 160 is disposed at least partially within an opening 149 in the front cap 101. A seal 110 may be positioned between the optical fiber holder 160 and the opening in the chamber 120 that the optical fiber holder 160 passes through. Another seal 110 may be positioned between the optical fiber holder 160 and the opening in the front cap 101 that the optical fiber holder 160 passes through. In this way, liquid and/or gas may not pass from the interior of the connector 130 into the chamber 120 or into the interface 135 between two connectors 150.

As shown in FIG. 3, the optical fiber holder 160 is coupled to a wall of the chamber 120 with a contact spring 140. The contact spring 140 provides a force that pushes the contact tubes 160 towards each other when the connectors 150 are mated. The contact spring 140 provides a biasing force on the optical fiber holder 160 and the optical fiber holder 160 can move into the chamber 120 and compress the contact spring 140 when a force is applied to the end of the optical fiber holder 160 opposite to the contact spring 140 during connector mating.

The optical fiber holder 160 includes a window 155 and a lumen 157 extending from the window 155 to the interface 135 between the connectors 150. An optical fiber 115 may be positioned such that the optical fiber 115 passes from the interior region 130 of a connector 150 and into the optical fiber holder 160 through the window 155, into and through the lumen 157, and into the interface 135 between the connectors. A seal 107 may be used to prevent liquid and or gas from passing from the interior 130 of the connector and into the interface 135 between the connectors 150. The seal 107 may comprise epoxy that fills at least a portion of the window 155 and/or lumen 157. The optical fiber 115 may be housed within a ferrule disposed within the optical fiber holder 160.

When the two connectors 150 are coupled together, the contact springs 140 provide a force that presses the contact tubes 160 together. In this way, the optical fibers 115 within the optical fiber holders 160 are also pressed together ensuring a tight connection between the optical fibers 115. Furthermore, because the contact springs 140 are located within the chambers 120, and the chambers 120 are at the same pressure because of the transfer tubes 145, there is no pressure difference between the chambers 120 and the only force on the optical fiber holders 160 is the force provided by the contact springs 140. Thus, while the pressure in the interior region 130 of one connector 150 may be greater than the pressure in the interior region 130 of the other connector 150, this pressure difference does not affect the force with which the contact tubes 160 are pressed against each other. Thus, the connectors 150 are configured to provide an external pressure independent contact force between two optical fibers 115 mated together. This configuration greatly reduces the risk of the optical fibers becoming damaged and/or misaligned.

Figure 4:
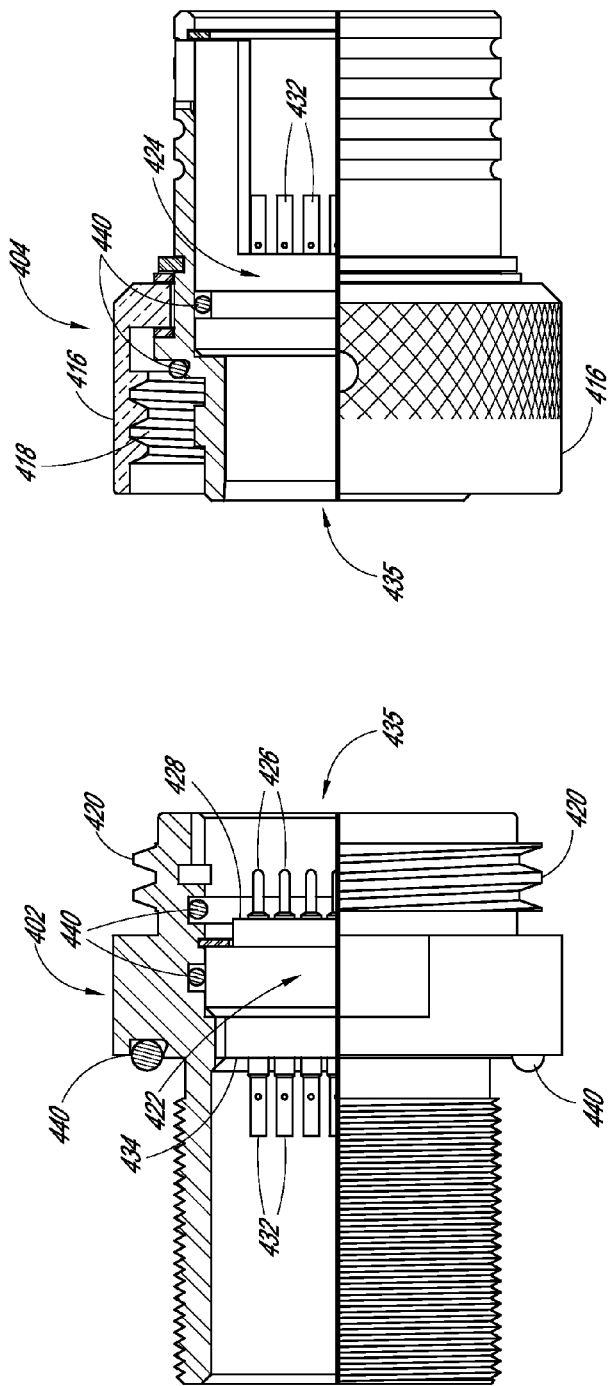
FIG. 4 is a side and partially cut away view of an example connector shell having connector inserts.

With brief reference to FIG. 4, a side and partially cut away view of an example connector shell having connector inserts is illustrated. The pair of connector shells 402 and 404 are configured to be coupled together in a pressure tight and/or water tight manner. The connector shells 402 and 404 contain insert bodies 422 and 424. The connector shells 402 and 404 may be coupled together using an engagement nut 416 having internal screw threads 418 that engage with external screw threads 420. The connection side faces 435 of the insert bodies may be enclosed in a sealed environment when the connector shells are coupled together. Insert body 422 may include a plurality of contact pins or ferrules that project from the front face 428 of the insert body 422. The rear face 434 of the insert body 422 may include a plurality of contact receiving projections 432 for connection to wire leads and/or fiber optic lines. A plurality of seals 440, O-rings for example, may be included to ensure a pressure tight and/or water right seal when the connector shells 402 and 404 are coupled together. Seals also provide a pressure tight and/or water tight seal that the rear face 434 of the insert body 422 is not in pressure and/or fluid communication with the front face 428 of the insert body 422.

Turning now to FIGS. 5A-5B, perspective views of a connector system 200 according to another embodiment are illustrated. Similar to the embodiment shown in FIG. 3, the connector system 200 includes two connector inserts 250 having chambers configured to be in pressure connection with the interface area between the two connectors 250. In this way, when two connectors 250 are coupled together, the chambers will have the same internal pressure which will be the same as the pressure at the interface between the two connectors. Accordingly, the connector system 200 is configured to provide a pressure independent contact force between two fiber optic (or electronic) terminals mated together.

As shown in FIGS. 5A-5B, the connector system 200 includes two connectors 250 and an alignment adaptor 210 therebetween. Each connector insert 250 includes an insert body 201 having a first end cap 203 secured to one end of the insert body 201 and a second end cap 205 secured the other end of the insert body 201.

The insert body 201 is generally cylindrically shaped and can be sized to mate with various sized PBOF cables as necessary. The insert body 201, first end cap 203, and second end cap 205 may be formed of swaged stainless steel, titanium, or other materials suitable for deep sea applications. As illustrated in FIG. 5B, the insert body 201 includes four windows 235. In this way, the interior 230 of the insert body 201 is in pressure communication with a cable secured about the insert body 201. More or fewer windows 235 may be provided and the windows may be shaped and sized as desired.

The first end cap 203 is sealingly secured to one end of the insert body 201. As shown, the first end cap 203 is secured to the insert body 201 by a plurality of fasteners such as screws. However, the first end cap 203 may be secured to the insert body 201 by other means such as a weld. One or more seal structure such as washers may be provided between the first end cap 203 and the insert body 201 to further ensure that liquid and/or gas may not ingress or egress between the first end cap 203 and insert body 201. As will be described below, securing the first end cap 203 to the insert body 201 forms a chamber that is in pressure communication with the opposite end of the insert body 201.

Second end cap 205 is sealingly secured to the end of the insert body 201 opposite to the end that includes a first end cap 203. As shown, the second end cap 205 may be secured to the insert body 201 by a plurality of fasteners such as screws. However, the second end cap 205 may be secured to the insert body 201 by other means such as a weld. One or more seals may be provided between the second end cap 205 and the insert body 201 to further ensure that liquid may not ingress or egress between the interface of the second end cap 205 and the insert body 201. As also shown, an alignment adapter 210 may be positioned between two inserts 250.

The insert body 201, first end cap 203, and second end cap 205 may be coupled to a cable with a jacket (not shown) that substantially surrounds the insert body 201, first end cap 203, and at least a portion of second end cap 205. The jacket may further include a connection mechanism such as a threaded connector configured to secure two inserts 250 together. Thus, the inserts 250 are configured to be coupled and secured together such that the alignment adapter 210 and at least a portion of both insert bodies 205 are enclosed in a sealed environment. In other words, liquid and/or gas cannot enter or exit the interface area between the inserts 250. The inserts 250 can be coupled together by any technique known in the art. The inserts 250 may be configured to couple to a bulkhead. In some embodiments, the inserts 250 may include a snap together or screw together connection. In some embodiments, the connector shells are configured to couple together and/or couple to a bulkhead. One or more seals or washers or other seal structures may also be included to ensure a pressure tight connection between two inserts 250.

Figure 6:
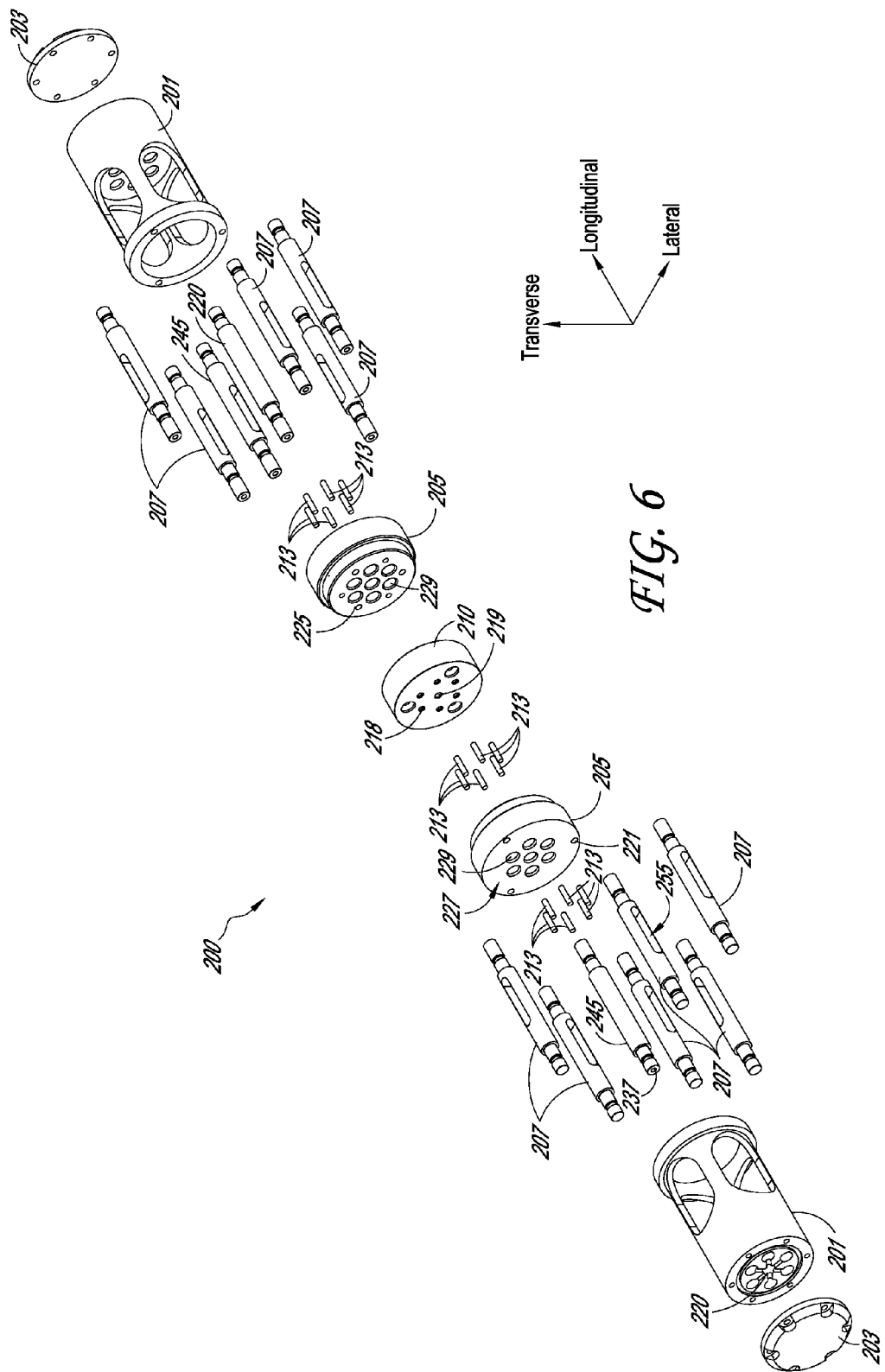
FIG. 6 is an exploded perspective view of the connector system of FIGS. 4A-4B.

With reference now to FIG. 6, an exploded view of the connector system 200 is illustrated. With the removal of the end cap 203 from the insert body 201, a chamber 220 can be seen. Within the insert body 201, a plurality of optical fiber holders 207 are spaced evenly apart about an internal diameter of the insert body 201. However, more or less optical fiber holders may be included and the optical fiber holders may be positioned in any suitable manner within the insert body 201. When assembled, the optical fiber holders 207 have one end at least partially disposed within the chamber 220. The optical fiber holders 207 then extend though the insert body 201 and have an opposite end at least partially disposed within the second end cap 205.

In the illustrated embodiment, a single equalizer tube 245 is positioned through the center of the insert body 201 and the single equalizer tube 245 is surrounded by the optical fiber holders 207. However, more or less equalizer tubes may be used. In some embodiments, an equalizer tube 245 is positioned in place of an optical fiber holder 207.

The equalizer tube 245 includes a lumen 237 extending therethough. When assembled, one end of the equalizer tube 245 is at least partially disposed within the chamber 220 and the other end of the equalizer tube 245 is at least partially disposed within the second end cap 205. In this way, the chamber 220 and connection face 225 of the second end cap 205 are in pressure communication. One of skill in the art will recognize that various solutions are available for providing a pressure communication link between the chamber 220 and the connection face 225 of an insert 250. For instance, any passageway configured to provide a pressure communication link between the front face of an insert and a chamber in the insert may be used.

Continuing with FIG. 6, the rear face 227 of the second end cap 205 can be seen. As shown, the second end cap 205 includes three fastener receiving openings 221. The fastener receiving openings 221 may be configured to threadingly engage a fastener such as a screw. The second end cap 205 also includes a plurality of openings 205 therethrough. The openings are sized to receive at least a portion of an optical fiber holders 207 or equalizer tube 245. The openings 205 and/or structure inserted therein are configured to prevent liquid and/or gas from passing through the interface between the opening 205 and structure inserted therein. Fluid and/or gas may only pass through the second end cap 205 via the lumen 237 in the equalizer tube 245 to and from the chamber 220.

A system for further aligning fiber optic leads may or may not be used with the connector system 200. As shown In FIG. 6, the connector system 200 also includes an alignment adaptor 210, a plurality of ferrules 213, and a plurality of alignment sleeves 215 to further align the optical fibers. The alignment adapter 210 includes a plurality of connection openings 218 and an equalizer opening 219 therethrough. The equalizer opening 219 provides a pressure communication link between the connection faces 225 of two inserts 250.

Figure 7:
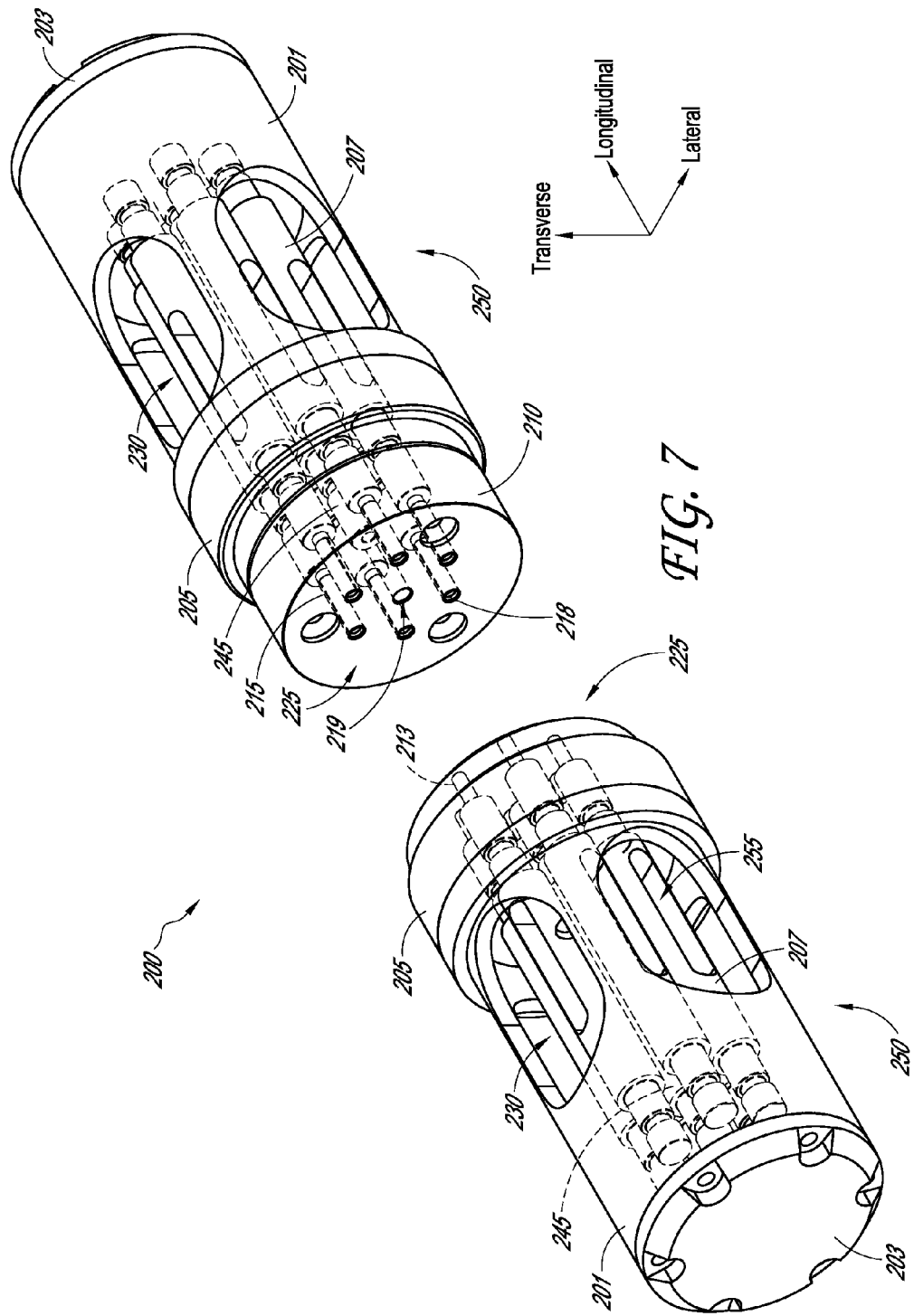
FIG. 7 is perspective view of the connector system of FIGS. 5A-5B illustrating the positioning of internal optical contact bodies and equalizer tube within the connector system.

The connection openings 218 are sized to receive an alignment sleeve 215. In use, two complimentary fiber optic terminals come in contact with each other within the connection openings 218. For explanation, a terminal end of an optical fiber exiting the connection face 225 of one insert may be at least partially surrounded by a ferrule 213 sized to receive the terminal end of a fiber optic lead. A terminal end of a second optical fiber exiting the connection face 225 of the opposing insert may be at least partially surrounded by ferrule 213 sized to receive the terminal end of a second fiber optic lead. The alignment sleeves 215 are configured to receive the ferrules 213. Thus, a terminal end of a fiber optic lead the ferrules can be at least partially inserted into a ferrule. The ferrule 213 can then be inserted at least partially into an alignment sleeve 215 disposed within a connection opening 218 thus further ensuring the aligned connection of the terminals of two optical fibers. FIG. 7 illustrates the positioning of internal optical fiber holders 207, equalizer tube 245, ferrules 213, and alignment sleeves 215 within the connector shell 205 and second end cap 205 according to some embodiments.

Figure 8B:
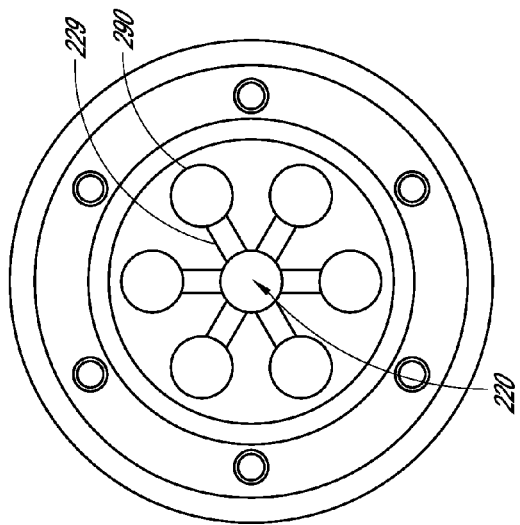
FIG. 8B is a bottom view of the connector insert of FIG. 8A.
Figure 8A:
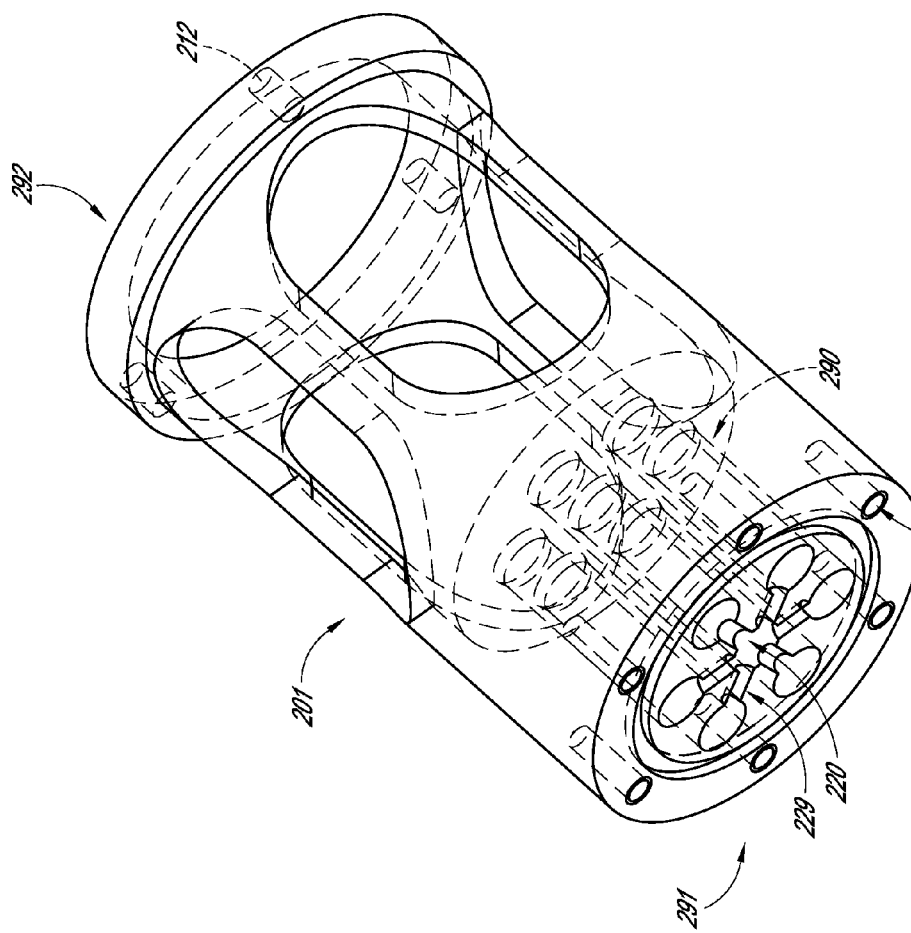
FIG. 8A is a transparent perspective view of the connector insert of the connector system of FIGS. 5A-5B.

Moving on to FIG. 8A, a transparent perspective view of the insert body 201 is shown to further illustrate the insert body 201 and chamber 220. The insert body 201 may include a first plurality of recesses 211 configured to receive fasteners to secure an end cap to the rear face 291 of the insert body 201 and a second plurality of recesses 212 configured to receive fasteners to secure an end cap 205 to the connection face 292 of the insert body 201. As noted above, other means for securing the end caps to the insert body 201 may be employed.

The chamber 220 includes a plurality of generally cylindrical chambers 290 shaped to at least partially receive an optical contact body and/or equalizer tube. One or more seals may be positioned between the optical contact body and/or equalizer tube and the tubular chamber 290 walls. In this way, liquid and/or gas may not enter the interior of the chamber 120. A spring or other biasing member may also be disposed with the cylindrical chambers 290 behind the optical contact body and/or equalizer tube positioned therein. The cylindrical chambers 290 may be configured to be in pressure communication with each other such that the entire chamber 220 is configured to have the same internal pressure. FIGS. 8A and 8B show that the insert body 201 includes radial passageways 229 that connect the cylindrical chambers 290 such that each chamber is in pressure communication even when an optical contact body and/or equalizer tube is disposed therein. The cylindrical chamber 290 running generally though the center of the insert body 201 may receive the equalizer tube while the remaining cylindrical chambers 290 may receive the optical fiber holders.

FIGS. 9A and 9B are enlarged views of an equalizer tube 245. The equalizer tube 245 includes a lumen 237 extending therethrough. The equalizer tube 245 also includes recesses 600 configured to receive pressure seals near both ends of the equalizer tube 245. The seals prevent liquid and/or gas from passing through the interface between the seal and the surface with which the seal is in contact with.

FIGS. 10A and 10B are enlarged views of an optical fiber holder 207. The optical fiber holder 207 includes a chamber end 703, a contact end 705, and a body portion 707 therebetween. The body portion includes a window 255 therethrough. A lumen 701 extends through the optical fiber holder 207 from the window 255 to the contact end 705. The optical fiber holder 207 also includes recesses 700 configured to receive pressure seals near both ends of the optical fiber holder 207. The seals prevent liquid and/or gas from passing through the interface between the seal and the surface with which the seal is in contact with.

A optical fiber may be positioned within the window 255 and through the lumen 701. In this way, a pathway is provided for the optical fiber to pass from the interior region of a connector to the interface between two connectors. After an optical fiber is inserted into the lumen 701, a seal may be used to prevent liquid and or gas from passing through the lumen. In some embodiments the seal comprises an epoxy. The chamber end 703 of the optical fiber holder 207 may be positioned at least partially within a chamber and may abut against a biasing mechanism such as a spring.

A cross-sectional view of the connection system 200 is shown in FIG. 11A. FIG. 11B illustrates a cross-sectional view of the connection system 200 used to connect two fiber optic lines. As shown, springs 800 may be disposed within the chamber. Specifically, springs 800 may be located in the cylindrical chambers 290 that also include at least a portion of an optical fiber holder 207. Thus, similar to the description concerning FIG. 3 above, the optical fiber holders are configured to slide within the cylindrical chambers 290. The contact springs 800 may provide a force that presses the optical fiber holder 207 against each other when two connectors are mated. Furthermore, the lumen 237 within the equalizer tube 245 provides a pressure communication link between the chamber 220 and the connection interface area 810.

With reference to FIG. 11B, a left optical fiber 801 enters the interior 230 of the connector through a window 235 in the insert body 201. The optical fiber 801 then passes through a window in an optical fiber holder 207 and into the lumen 701. The optical fiber 801 then passes through a ferrule 213 that is partially disposed within the optical fiber holder 207 and the alignment adapter 210. A right optical fiber 802 enters the interior 230 of the opposing connector through a window 235 in the opposing insert body 201. The optical fiber 802 then passes through a window in an optical fiber holder 207 and into the lumen 701 therethrough. The optical fiber 802 then passes through an alignment sleeve that is partially disposed within the optical fiber holder 207 and the alignment adapter 210. Thus, the left optical fiber 801 and right optical fiber 802 are connected. The springs 800 provide a biasing force against the optical fiber holders 207 which is approximately constant because there is no pressure difference between the chambers of each insert 250 due to the sealed pressure communication link between the two chambers.

Of course, it is to be understood that not necessarily all objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the features of the connection systems disclosed in the various embodiments can be switched between embodiments. In addition to the variations described herein, other known equivalents for each feature can be mixed and matched by one of ordinary skill in this art to construct connection systems in accordance with principles of the present invention.

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above.

The scope of protection is limited solely by the claims that follow. That scope is intended and should be interpreted to be as broad as is consistent with the ordinary meaning of the language that is used in the claims when interpreted in light of the specification and prosecution history and to encompass all structural and functional equivalents.

What is claimed is:

1. A connector comprising:
   a connection face;
   a chamber;
   at least one optical fiber holder, having a first end positioned within at least a portion of an opening in the connection face and a second end positioned within at least a portion of the chamber, the at least one optical fiber holder having at least one lumen extending from the opening to the connection face and an opening in a side surface for receiving an optical fiber, the optical fiber holder including;
   at least one biasing element positioned within the chamber and configured to bias the optical fiber holder toward the connection face; and
   at least one passageway from the chamber to the connection face, the passageway providing a pressure communication link between the connection face and the chamber.

2. The connector of claim 1, further comprising an optical fiber positioned at least partially within the opening and the lumen.

3. The connector of claim 2, wherein the optical fiber has an angled terminal end.

4. The connector of claim 2, wherein the optical fiber is sealed within the lumen.

5. The connector of claim 2, wherein no portion of the optical fiber is positioned within the chamber.

6. The connector of claim 1, wherein the optical fiber holder is longitudinally movable between a first position when the connector is not connected with another connector and a second position when the connector is connected with another connector.

7. The connector of claim 1, further comprising a first seal between the first end of the optical fiber holder and the opening in the connection face and a second seal between the second end of the optical fiber holder and the chamber.

8. The connector of claim 1, wherein the at least one biasing element comprises a coil spring.

9. The connector of claim 1, wherein each biasing element is coupled to a corresponding optical fiber holder.

10. A connector comprising:
    a connection face;
    a chamber;
    at least one optical fiber holder, having a first end positioned within at least a portion of an opening in the connection face and a second end positioned within at least a portion of the chamber, the at least one optical fiber holder having an opening in a side surface for receiving an optical fiber;
    at least one biasing element positioned within the chamber and configured to bias the optical fiber holder toward the connection face; and
    at least one passageway providing a pressure communication link between the chamber to the connection face, the passageway comprising a lumen extending through a tube having a first end positioned within at least a portion of an opening in the connection face and a second end positioned within at least a portion of the chamber.

11. The connector of claim 10, further comprising an optical fiber positioned at least partially within the fiber optic holder.

12. The connector of claim 11, wherein the optical fiber extends from the opening in the connection face to the opening in the side surface.

13. The connector of claim 11, wherein the optical fiber is sealed within the fiber optic holder.

14. The connector of claim 11, wherein the optical fiber has an angled terminal end.

15. The connector of claim 11, wherein no portion of the optical fiber is positioned within the chamber.

16. The connector of claim 10, wherein the optical fiber holder is longitudinally movable between a first position when the connector is not connected with another connector and a second position when the connector is connected with another connector.

17. The connector of claim 10, further comprising a first seal between the first end of the optical fiber holder and the opening in the connection face and a second seal between the second end of the optical fiber holder and the chamber.

18. The connector of claim 10, wherein the at least one biasing element comprises a coil spring.

19. The connector of claim 10, wherein each biasing element is coupled to a corresponding optical fiber holder.

\* \* \* \* \*